Figure 1:
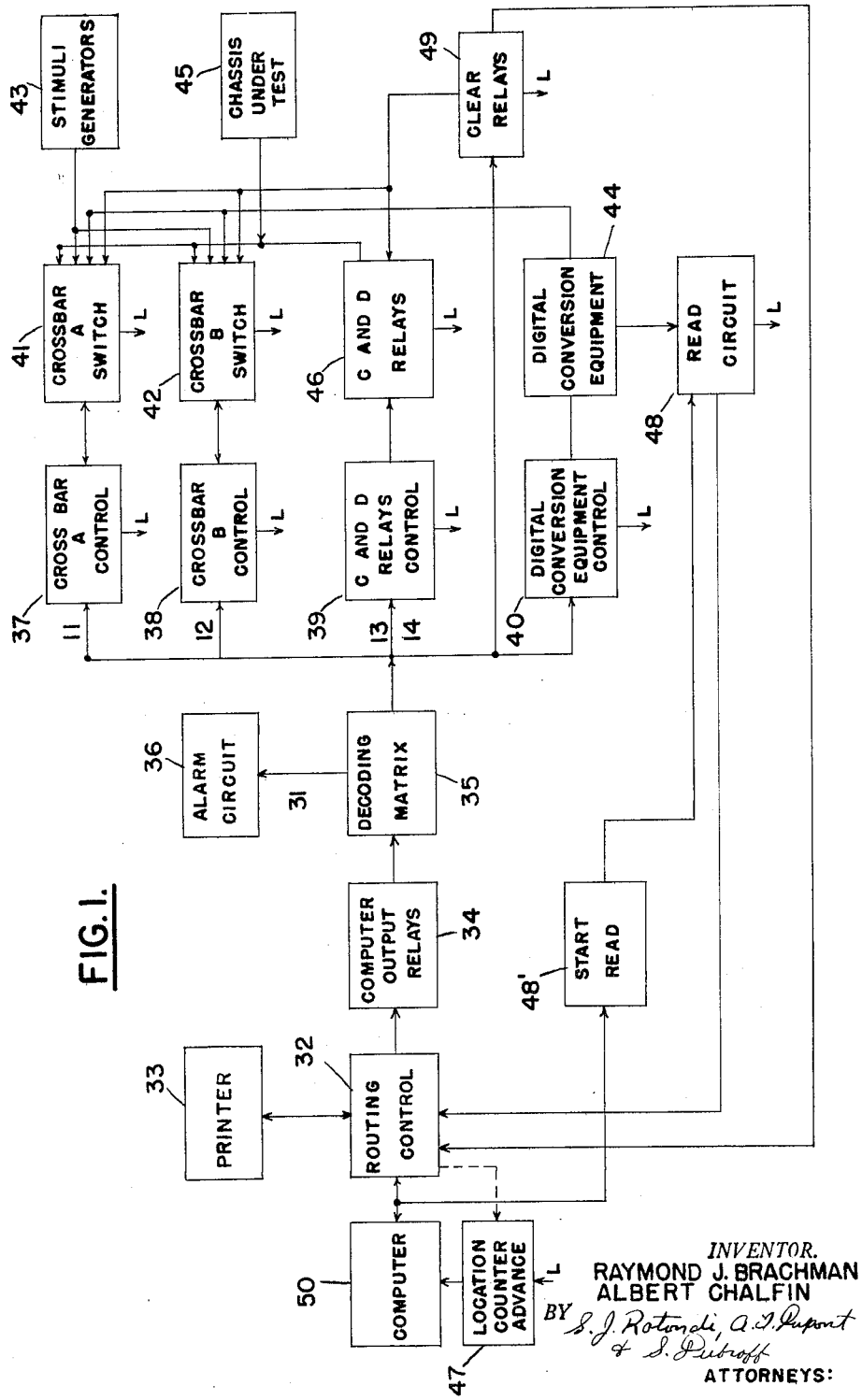

INVENTOR.
RAYMOND J. BRACHMAN
ALBERT CHALFIN

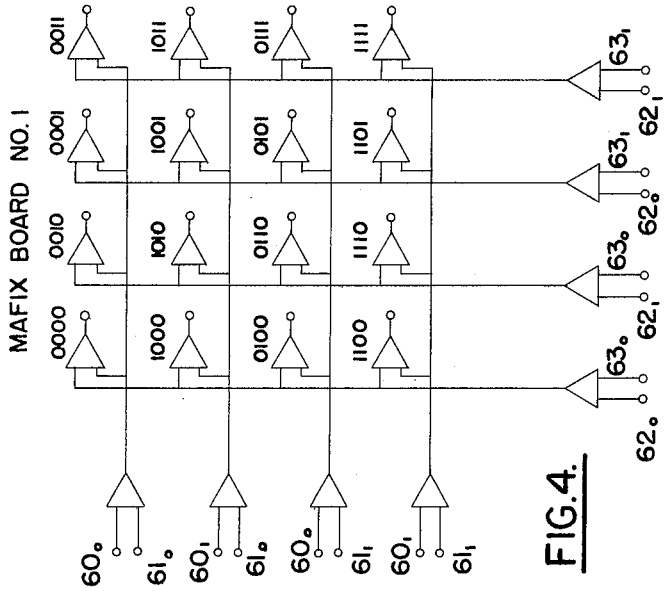
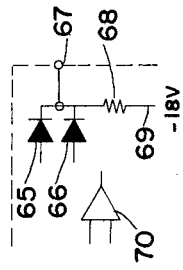
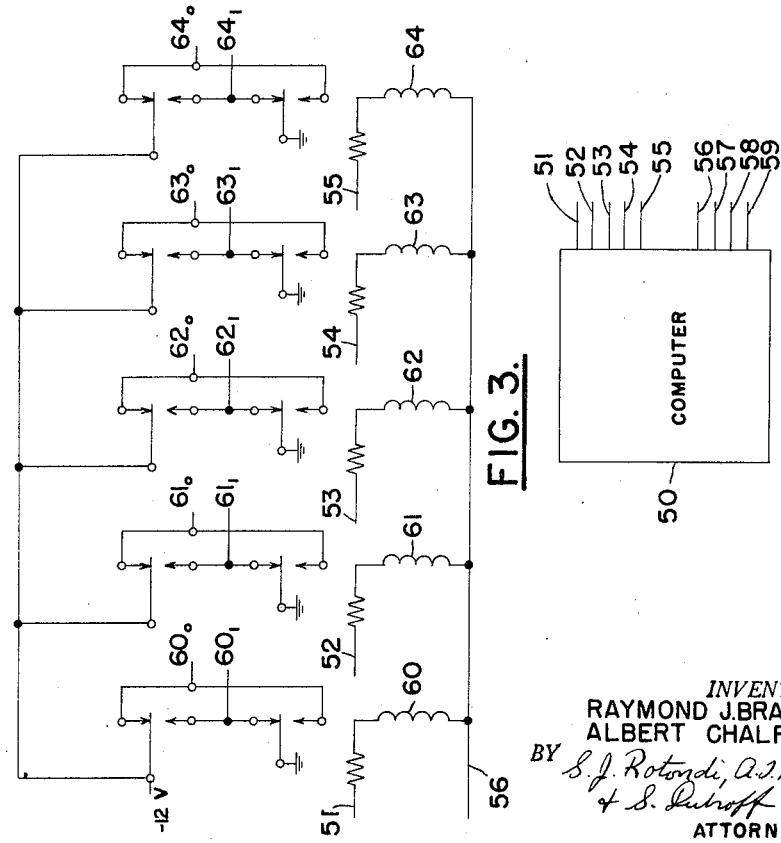

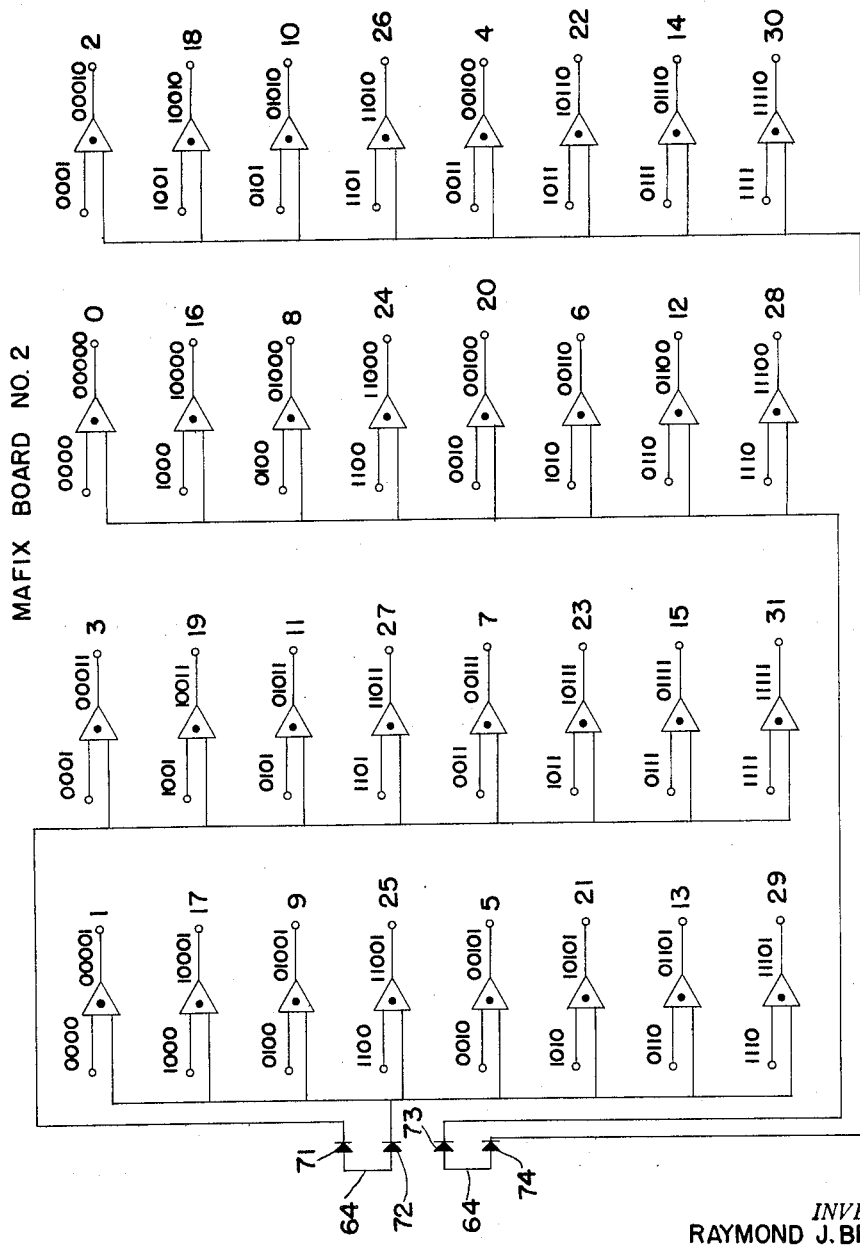

INVENTOR.
RAYMOND J. BRACHMAN
ALBERT CHALFIN

*INVENTOR.*
RAYMOND J. BRACHMAN
ALBERT CHALFIN

Feb. 22, 1966  A. CHALFIN ETAL  3,237,100
COMPUTER-CONTROLLED TEST APPARATUS FOR COMPOSITE
ELECTRICAL AND ELECTRONIC EQUIPMENT
Filed June 24, 1960  13 Sheets-Sheet 7
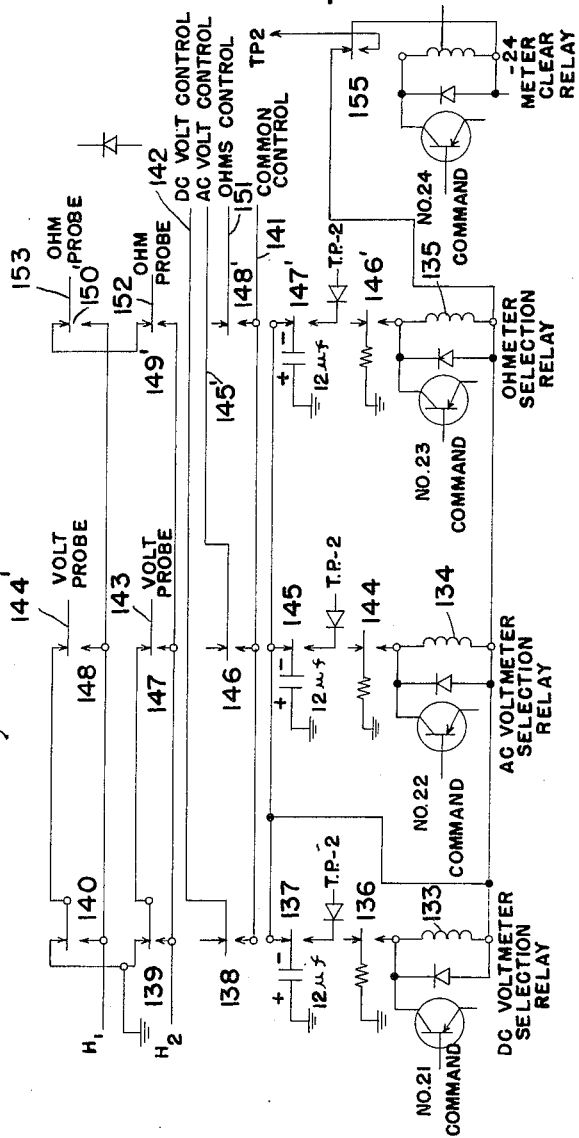
*INVENTOR.*
RAYMOND J. BRACHMAN
ALBERT CHALFIN
BY
*S. J. Rotondi, A. J. Dupont*
*& S. Duroff*  ATTORNEYS.

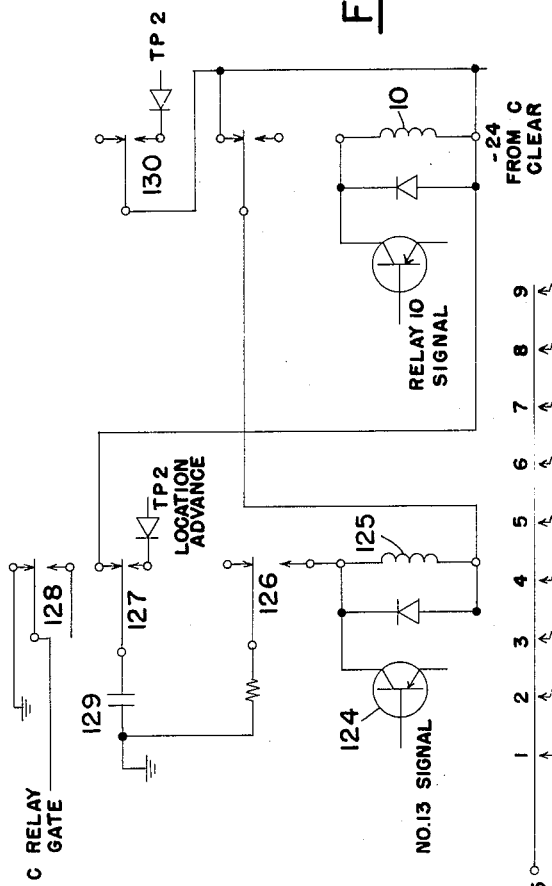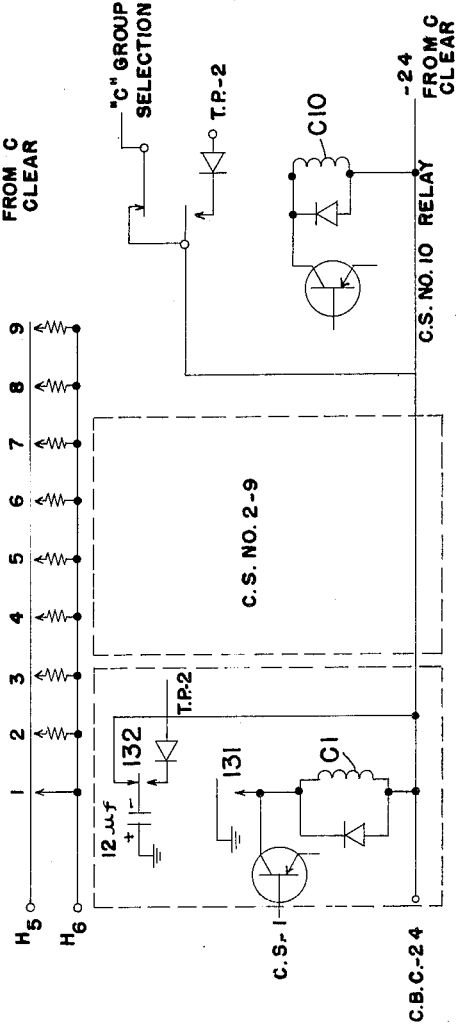

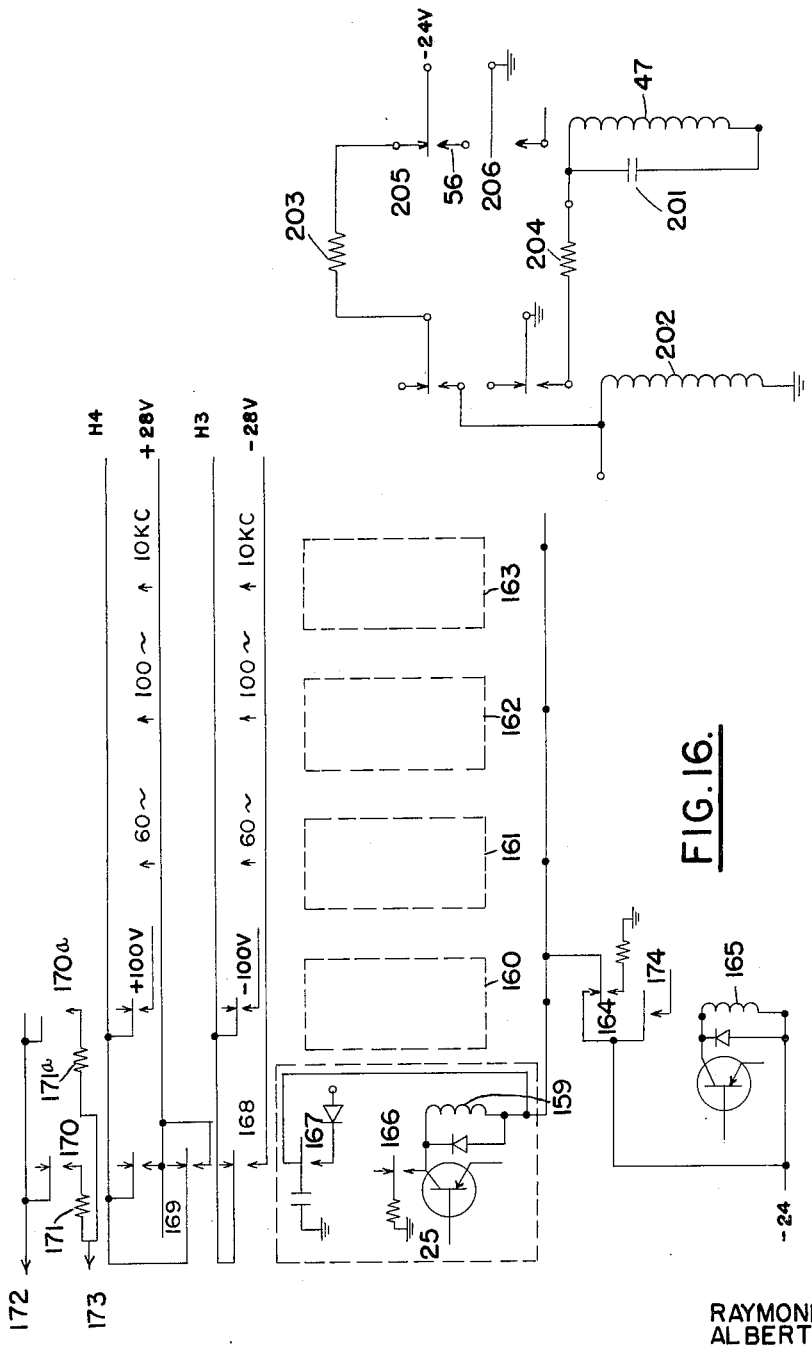

Feb. 22, 1966 A. CHALFIN ETAL 3,237,100
COMPUTER-CONTROLLED TEST APPARATUS FOR COMPOSITE
ELECTRICAL AND ELECTRONIC EQUIPMENT
Filed June 24, 1960 13 Sheets-Sheet 10

INVENTOR.
RAYMOND J. BRACHMAN
ALBERT CHALFIN
BY
ATTORNEYS:

United States Patent Office 3,237,100
Patented Feb. 22, 1966

3,237,100
COMPUTER-CONTROLLED TEST APPARATUS FOR COMPOSITE ELECTRICAL AND ELECTRONIC EQUIPMENT
Albert Chalfin, 6729 Sylvester St., and Raymond J. Brachman, 1368 N. 75th St., both of Philadelphia, Pa.
Filed June 24, 1960, Ser. No. 38,679
2 Claims. (Cl. 324—73)
(Granted under Title 35, U.S. Code (1952), sec. 266)

The invention described herein may be manufactured and used by or for the Government for governmental purposes without the payment to us of any royalty thereon.

This invention relates to systems and apparatus for checking the condition of a device or equipment to be tested, and more particularly to test or checkout system or apparatus which functions automatically (1) to perform tests on the various components of a device or equipment to be tested and (2) to analytically evaluate a spectrum of the results of such tests. From this evaluation, the system or apparatus determines the performance characteristics of the tested device and makes a specific fault diagnosis at the piece-part or component level. The central control element of the test or checkout system or apparatus is a digital computer. The system is capable of testing any item, unit or material involving test information which is convertible into a form acceptable by the computer.

The conventional serial programmed automatic checkout system utilizes a punch paper tape, punch card, wire patch board, or a magnetic tape as a programmer to control its operation. This requires accessibility of the parts to be tested, and requires a relatively high level of skill on the part of the maintenance personnel for the reason that the operator is required to evaluate the test results to diagnose the component failure.

The test or checkout system or apparatus of the present invention makes it unnecessary for the operator to evaluate the test results and permits operation by an operator having a relatively low-level of skill. This result is achieved by utilizing the computer memory to store the test program as well as the test evaluation procedure. As hereinafter explained, the computer is capable of energizing necessary stimuli and performance measurements on the unit under test. Such stimuli may be taken herein to refer to the operational voltages and signals, in form and magnitude, as normally handled by the device or equipment being tested. It is also able to store a series of measurement values in its memory and, after the completion of a series of tests, evaluate these test results to diagnose component failure.

This evaluation is actually an analysis of the test results made automatically either mathematically or by some logic or inductive process. Having accomplished its evaluation and determined the exact cause of the fault, the system can then function to indicate the component to be replaced, repaired or adjusted with specific repair instructions if desired.

A suitable form of computer is that known as the "Royal Precision Electronic Computer (LCP–30)" which is described in a "Maintenance Manual," published by the Royal McBee Corporation, Port Chester, New York. This computer provides for conditional commands which make it possible to omit tests and evaluations which are not required where previous results so indicate. This is the case, for example, where a test is performed on the last component of a device or circuit in which a number of units are connected in series and a good test can be obtained only if all the series connected units are good. If the test result indicates malfunction, the series-connected units are then tested individually. This is accomplished automatically by the program utilizing the conditional command structure of the computer.

It is possible with this computer controlled checkout equipment to perform much greater piece-part fault isolation than has been heretofore realized. This is so for the reason that the computer utilizes an interrelation of a number of measurements to diagnose malfunction. This is the method employed by the most skilled maintenance personnel. Since this interrelation of measurements is programmed into the computer as a result of a prior circuit analysis of the device to be tested, it is as if the brains of the designer and the best malfunction diagnostition were incorporated into the checkout system's performance. Otherwise stated, the checkout system of the present invention is operable to test a device, describe its maintenance requirements and instruct an operator having a low level of technical skill as to the required repairs or replacements. Thereafter, the system can requalify the tested device.

The invention will be better understood from the following description when considered in connection with the accompanying drawings and its scope is indicated by the appended claims.

Figure 7:
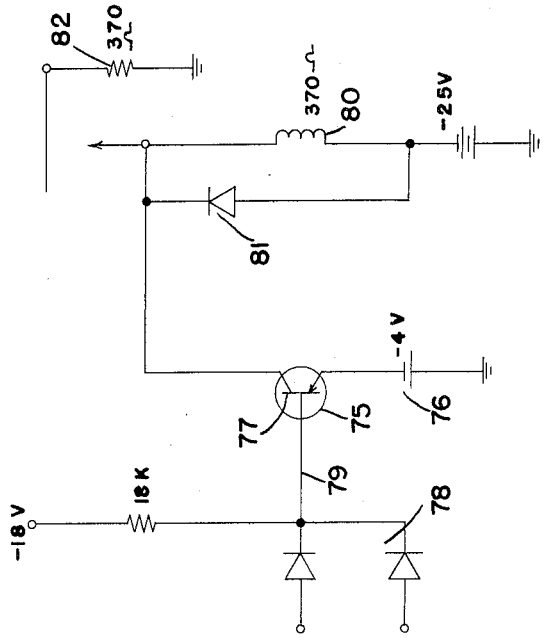
Figure 8:
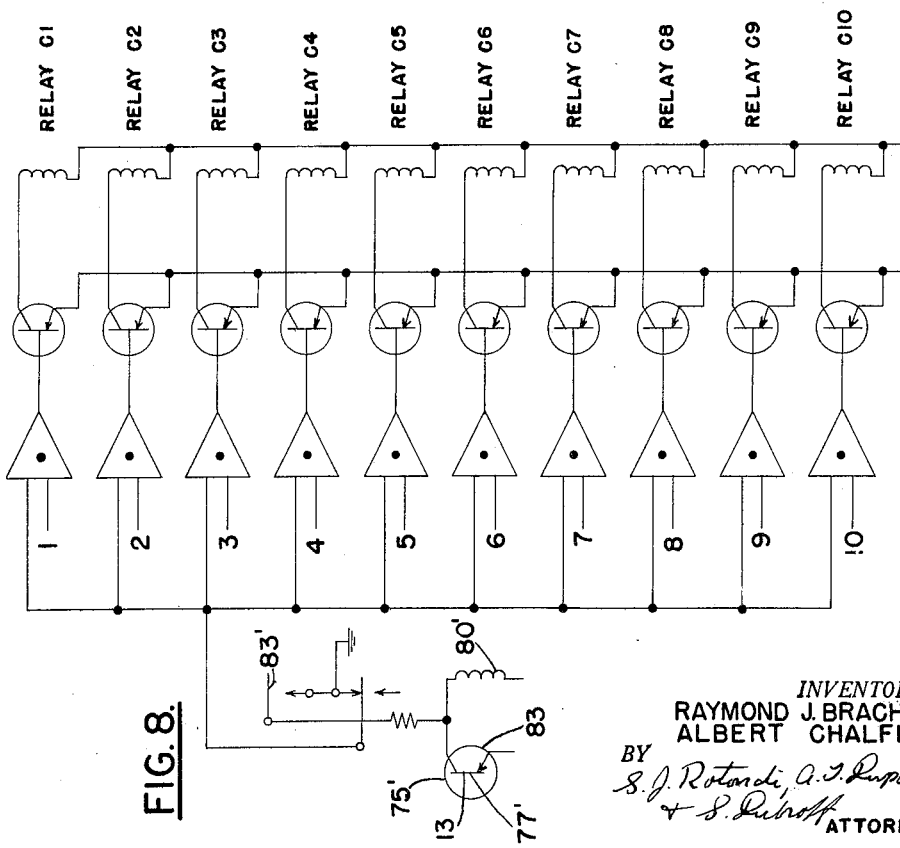
Figure 11:
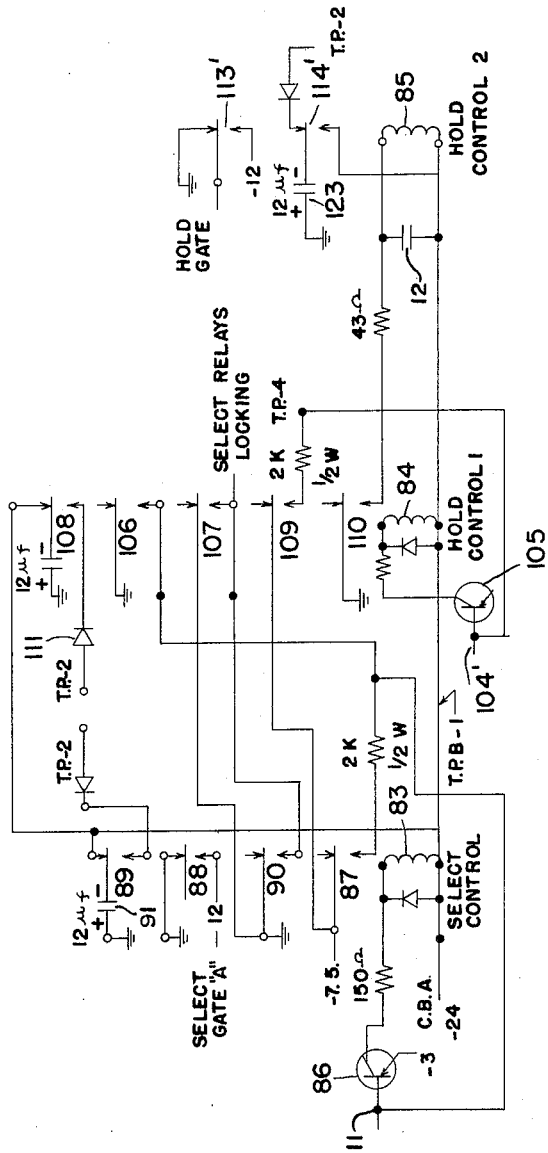
Figure 9:
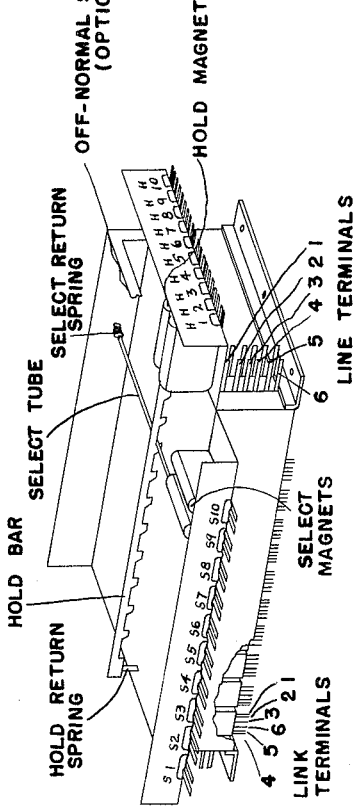
Figure 10:
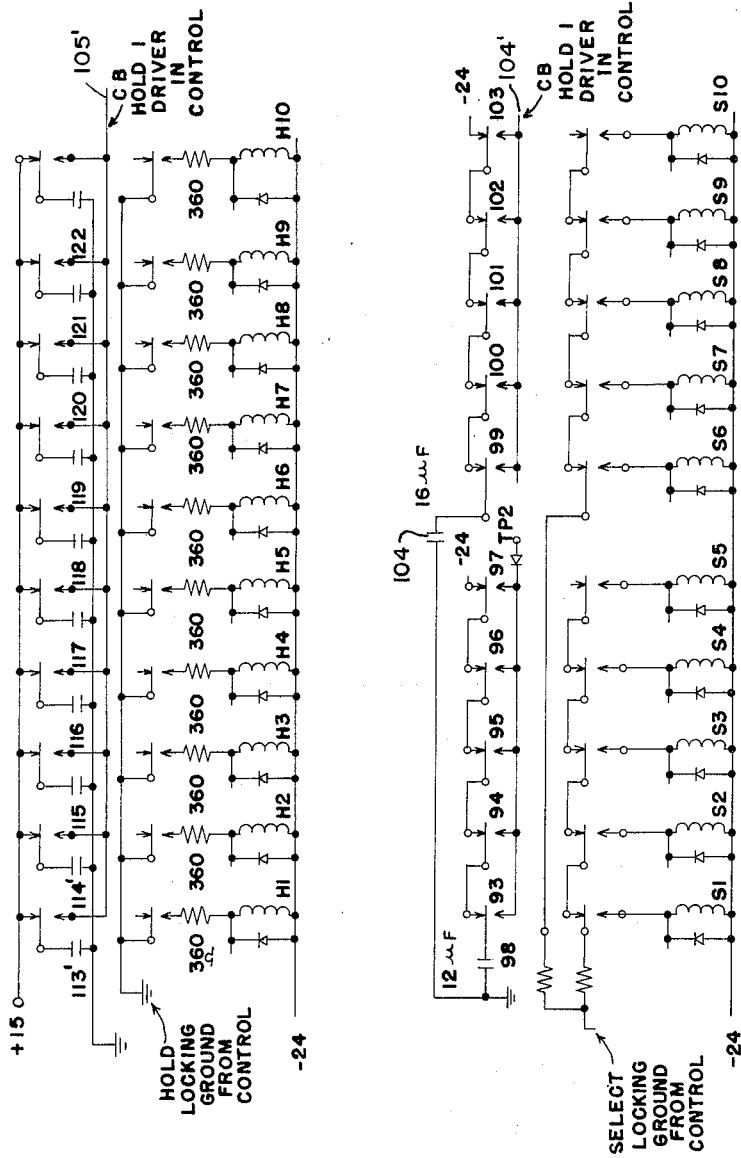
Figure 17:
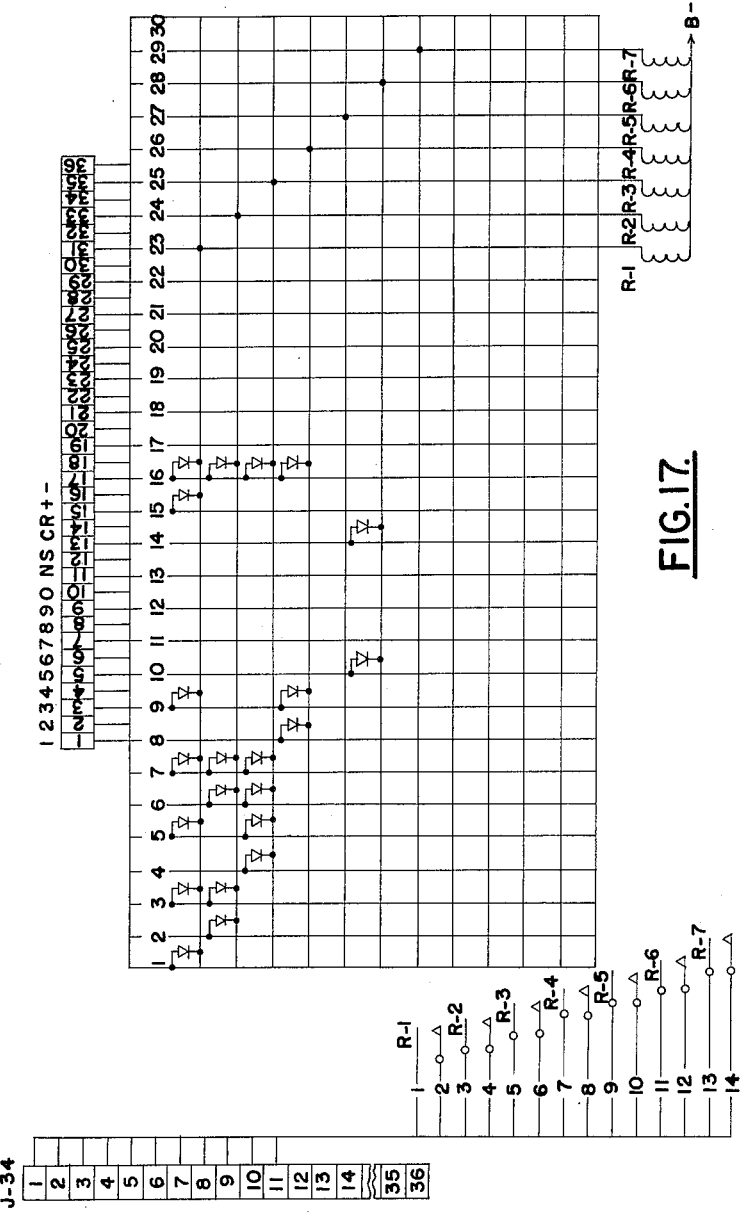
Figure 18:
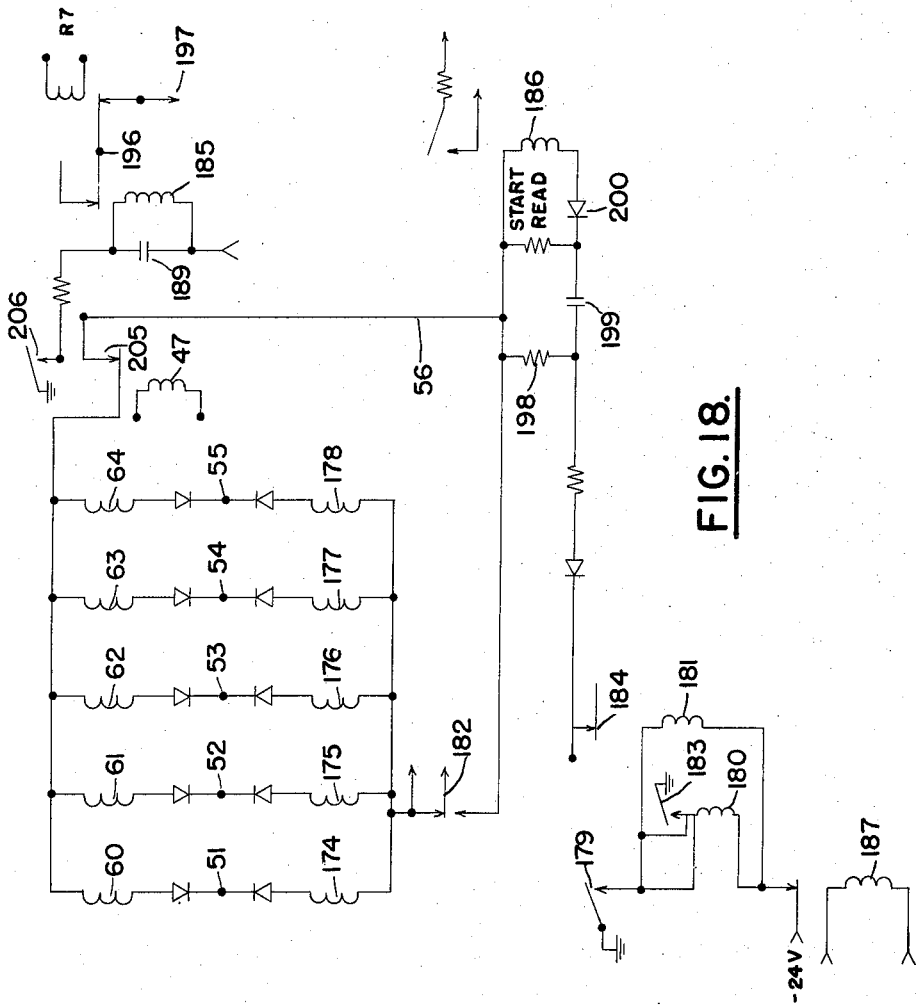
Figure 19:
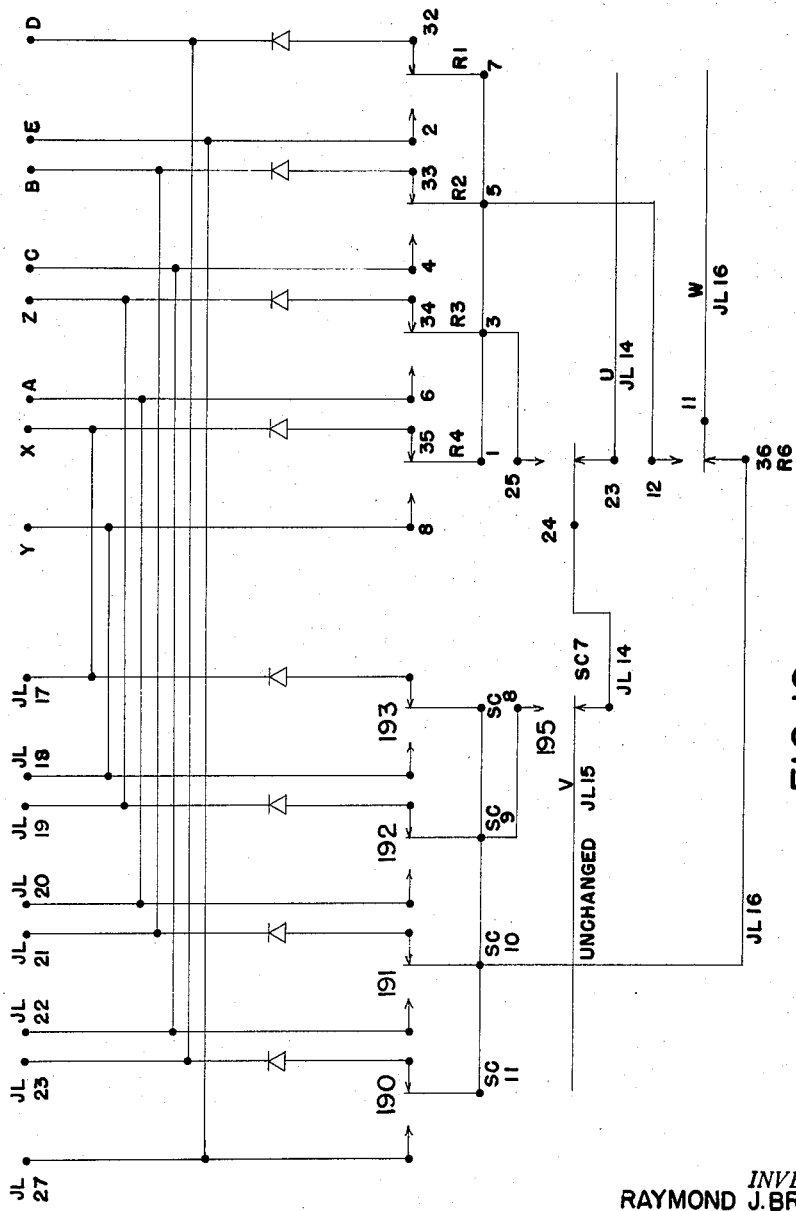
Figure 21:
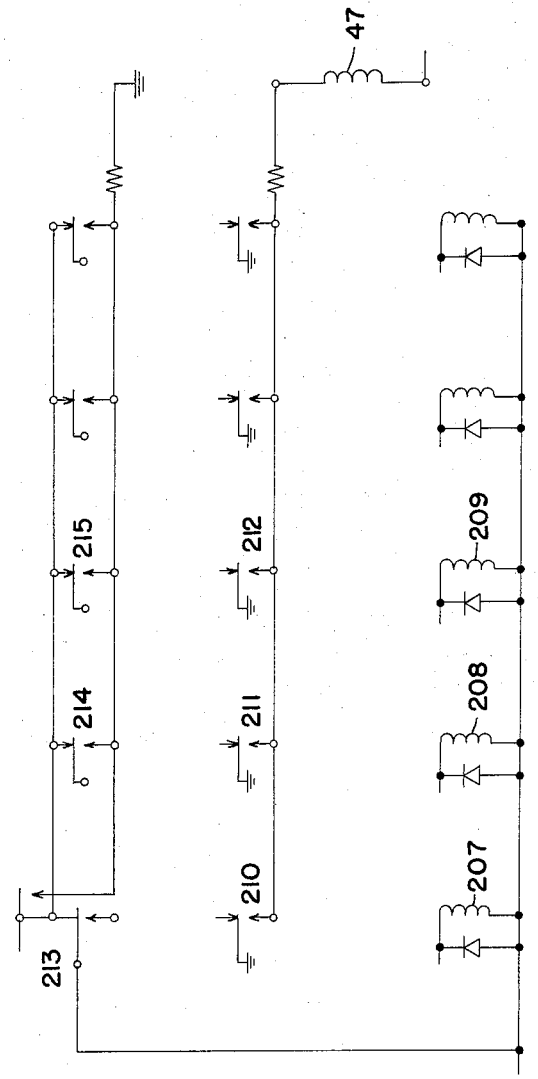

Referring to the drawings:

FIG. 1 is a block diagram indicating the relation between the various parts of the checkout system, FIG. 2 illustrates the computer as a block with the output and control leads through which it functions as the central control unit of the checkout system, FIG. 3 is a wiring diagram of the computer output relays, FIGS. 4 and 5 show different parts of a decoding matrix to which the output leads of the computer output relays are connected, FIG. 6 is an explanatory diagram relating to the "and" gates which form a part of the decoding matrix, FIG. 7 is a wiring diagram of a relay driver circuit which is used when a relay is energized from an "and" gate, FIG. 8 is a wiring diagram of a relay group wherein the group is selected by one code number and the individual relays are each selected by a different code number, FIG. 9 is a perspective showing of one of the two similar crossbar switches which connect the checkout system to the tested device, FIG. 10 is a schematic of the crossbar select and hold relays, FIG. 11 is a crossbar control circuit which functions through circuits similar to that of FIG. 8 to control the select and hold relays of FIG. 10, FIG. 12 is a contact schematic of the H1 relay of FIGS. 9 and 10, FIG. 13 shows a control circuit used, for each of a "C" relay group and a "D" relay group, FIG. 14 shows the schematic for one of these relay groups ("C" or "D"), FIG. 15 is a wiring diagram of the digital conversion equipment control circuit, FIG. 16 is a wiring diagram of a stimuli control circuit, FIG. 17 illustrates an encoding matrix which form a part of the read circuit, FIG. 18 shows the circuit for rerouting the computer output from the flexowriter to the computer output relays, FIG. 19 is a wiring diagram of the circuit through which the output of the read circuit is fed to the computer, FIG. 20 shows the location advance circuitry, and FIG. 21 illustrates the connection of the clear relays which function to release all relays which may be locked closed.

The block diagram of FIG. 1 shows a computer 50. Normally this computer sends signals to a suitable signal-responsive electrically-operated character printer or typewriter 33, which may be a device or machine known commerically as a Flexowriter. Such a printer may be of the line printing type if desired, and responds to electrical coded signals which designate the characters to be printed by operation of the mechanism thereof. The Flexowriter printer or typewriter was modified for use in the present checkout system by rearranging its connections so that whenever a carriage return, tab or backspace signal is sent thereto it executes the command and thereafter operates through a routing circuit 32 to transfer the computer output connections to a group of signal responsive components 34 and to then inactivate itself. Thereafter, the Flexowriter or printer 33 remains inactive until it is reactivated by a special command signal, and the computer command signals are applied to the signal responsive components 34.

These components may be relays, multivibrators, solid state flip-flops or other devices which are capable of providing the desired response to the command signals appearing at the output terminals of the computer. This is true of many other components of the checkout system which are hereinafter illustrated as relays. In all of these cases, any components exhibiting the two state operation of relays can be used without altering the characteristics of the system. The computer output relays are illustrated as a group of five relays which are each connected to provide at one terminal a standard voltage and at another terminal a zero voltage.

The ten output terminals of the relays 34 are connected to a decoding matrix 35 which provides at its thirty-two output terminals thirty-two separate and distinct command signals. These command signals are designated by decimal numerals and are utilized for various purposes. For example, signal 31 selects an alarm circuit 36, signal 11 selects a switch control circuit 37, signal 12 selects a switch control circuit 38, and signals 13 and 14 select the "C" and "D" groups of relays. Other signals select various components of the switch control circuits, the relay group and the digital conversion equipment control circuit 40 as later explained.

The switches 41 and 42, controlled by the circuits 37 and 38, function to control the connections between stimuli sources 43 and the device 45 to be tested. They also function to control the connection between the tested device and measurement equipment 44. The relay groups 39 operate to vary the constants of certain connections in the crossbar switches 41 and 42 as indicated hereinbefore, the stimuli supplied from the sources or generator 43, may be the operational or power supply voltages of the kinds and at the levels, and/or the FM, sinewave, pulse and like operating signals at the magnitudes, as normally handled by the device to be tested.

When an operation commanded by any of the thirty-two signals has been completed, a location advance relay 47 is operated to transfer control of the computer program to the instruction contained in the next memory location. This is indicated in FIG. 1 by a plurality of leads which are indicated by the letter "L."

Once a measurement has been established in the digital conversion equipment 44, this measurement is read into the computer 50 by a read circuit 48 which is put into operation by a signal applied from the computer to a start read circuit 48'. The recorded measurement is in the form of a magnetic record which may be spelled out by the printer 33 either alone or together with instructions pertinent to the tested part or component.

The box 49 represents a plurality of "clear" relays which function to release such checkout system relays as remain locked or closed after the completion of a measurement. One of these relays operates to release all the locked relays of the system. Other of these relays perform a similar function in connection with locked relays of the A and B crossbar switches.

The central control unit of the present checkout system is the digital computer 50 which is shown in FIG. 2 as a box and has been identified above in connection with FIG. 1. This computer has information output terminals 51 to 55 at which command signals appear, and a return lead 56. It also has leads 57, 58 and 59 which are connected to the location advance relay 47 (FIG. 1).

The information terminals 51 to 55 are connected through the routing circuits 32 (FIG. 1) to the correspondingly identified terminals of the computer output relays 60 to 64 of FIG. 3. A 90 v. D.-C. signal on the information lines 51 to 55 is used to energize the relays 60 to 64, the 90 v. signal being dropped to 24 v. D.-C. through a 1K, 5-watt resistor in the case of each line.

The five relays 60 to 64 may or may not be energized depending on the command transmitted to them from the computer. The command or code 00000, for example, would have no relay energized. The code 00011 would have relays 63 and 64 energized. Each digit of the 5-digit code has one of the two possible states. Either the digit is a "one" or a zero. The "one" state is represented by an energized relay.

Throughout the checkout system, a voltage of −12 v. represents a true state and a ground signal represents a false state. The ten output lines of the computer output relays (FIG. 3) are identified by the corresponding relay numbers followed by a subscript 1 or 0. Thus for the relay 60 in the energized state, the output lead $60_1$ must be at −12 v. indicating a true state and the output lead $60_0$ must be at ground indicating a false state. When the relay 60 is energized, the voltages representing the true and false states are reversed.

Although there are only five different information relays 60 to 64, there are thirty-two different configurations of energized and de-energized relays which are available. These thirty-two different configurations must be decoded in order that there may be on only one of the thirty-two separate output lines a signal which is uniquely determined by the particular configuration which exists on the relays 60 to 64. This is accomplished by the decoding matrix boards shown in FIGS. 4 and 5. The function of these matrix boards is to decode the ten output signals of the computer output relays (FIG. 3) and provide on any one of the thirty-two output lines of the No. 2 board (FIG. 5) a signal which is uniquely determined by the combination present on the relay output lines.

The decoding matrix boards No. 1 and No. 2 are composed of a series of "and" gates similar to that shown in FIG. 6. Each of these gates has as its input a pair of diodes 65 and 66 and has its output leads 67 connected through a resistor 68 to a −18 v. terminal 69. In the matrices, the gates are represented as indicated by the symbol 70. The diodes are Hughes HD2289 and the resistors are 100K, ½ watt.

This gate will deliver at its output terminal 67 a −12 v. signal, if and only if, all the input signals are −12 v. Since in the checkout system −12 v. is equivalent to a true signal, another way of defining the "and" gate is to say that the gate output is true, if and only if, all the inputs are true. Proper operation of the gate requires that no input be floating. The inputs must be maintained at either a true or false state.

Obviously these "and" gates may be partially or altogether replaced by other types of gates such as the "nor" gates and "or" gates described in Richard K. Richards' book entitled "Arithmetic Operation in Digital Computer," published by D. Van Nostrand, 1955. Such gates perform a transmission function in conformance with a set of logical rules and are sometimes called logical gates. The term "gate means" as used herein is intended to include different types of logical gates.

The decoding matrix board No. 1 (FIG. 4) takes the output signals of the relays 61 to 63 as indicated by the reference numerals common to FIGS. 3 and 4. The outputs of these relays represent the four most significant digits. Board No. 1 decodes these four outputs so that sixteen different outputs are available at the output terminals of the matrix.

The No. 2 matrix board takes these sixteen different outputs of the No. 1 board, as indicated by the binary numbers common to FIGS. 4 and 5, and gates them with the output of the relay 64. This is effected by means of diodes 71 and 72 which connect the $64_1$ terminal to one-half of board No. 2, and by means of diodes 73 and 74 which connect the $64_0$ terminal to the other half of the same board. In this way the outputs of relays 60 to 64 are gated and decoded so that only one of the thirty-two output terminals 0 to 31 will be true for any combination of matrix inputs. These thirty-two output terminals are also indicated by the corresponding binary numerals, the decimal equivalents of these binary numerals being used hereinafter when referring to the command signals appearing at the output leads of the decoding matrix board No. 2.

The value of the gate resistor 68 (FIG. 6) is determined by the load conditions present. Where the gate feeds another gate, 100K resistors are used. Where the gate drives a relay driver transistor, 18K resistors are used.

Whenever a relay is to be controlled by a signal delivered from an "and" gate, the circuit of FIG. 7 is used to provide power amplification. The circuit includes a transistor 75 (Philco 2N599) which has its emitter biased —4 v. by a battery or other voltage source 76. Its base 77 is held at ground potential by gate 78 until the required signal is applied to the input diodes. When the gate is turned on, a voltage of —12 appears at the gate output lead 79. This turns the transistor "on," permitting current to flow in the load circuit. The base voltage drops to —4 v. but the transistor continues in a conductive state until the base drops to ground potential.

The transistor 75 is capable of delivering 400 ma. to the relay coil 80 which has a resistance of 370 ohms. The base current required to trigger the transistor is less than 1 milliampere. A diode 81 protects the transistor 75 from voltage surges. The relay is locked in the "on" position by locking circuitry, from its contacts, the locking voltage being dropped to about 13 volts by a 370 ohm resistor 82.

All the functions of the checkout system are effected in response to signals delivered from the output terminals 0 to 31 of the decoding matrix board No. 2 (FIG. 5). Since the required number of control functions is in excess of sixty, it is necessary to expand the control functions obtainable from the decoding matrix. This is accomplished by six units similar in most respects to that of FIG. 8. Four of these units function in connection with the "select" and "hold" relays of the A and B crossbar switches 41 and 42 through which stimuli, as referred to, are applied to the tested device and from which the measurement data is conveyed to the digital conversion equipment 44. Another unit controls the "C" group of ten relays, and the remaining unit controls the "D" group of ten relays. Each of these units has a group selection relay which is locked closed upon its energization by an assigned signal. Thereafter the individual relays of the group are selected by one or another of the command signals 1 to 10. Upon the termination of the movement, the group selection relay can be deenergized by a "clear" relay which operates in response to an assigned command signal.

Thus in the circuit of FIG. 8, command signal 13 is applied to the base 77' of a transistor 75' for energizing a group selection relay 80' which is locked closed by its contacts 83'. Only one signal is applied at a time, the group selection signal 13 being followed by signals selected successively from the individual code signals 1 to 10. Since only one signal can be transmitted at a time, provision is made to lock the group selecting relay 80' to the "and" gates as indicated above.

The "D" relays are controlled in the same way as the "C" relays.

The manner in which the thirty-two code signals are utilized is indicated by Table I.

*Table I*

| Code: | Function | Code: | Function |
|---|---|---|---|
| 0 | Unused. | 16 | General clear. |
| 1 | Relay 1. | 17 | A clear. |
| 2 | Relay 2. | 18 | B clear. |
| 3 | Relay 3. | 19 | C clear. |
| 4 | Relay 4. | 20 | D clear. |
| 5 | Relay 5. | 21 | D.C. voltmeter. |
| 6 | Relay 6. | 22 | A.C. voltmeter. |
| 7 | Relay 7. | 23 | Ohmmeter. |
| 8 | Relay 8. | 24 | Meter clear. |
| 9 | Relay 9. | 25 | 28 v. D.C. |
| 10 | Relay 10. | 26 | 100 v. D.C. |
| 11 | A crossbar. | 27 | 60 cycles. |
| 12 | B crossbar. | 28 | 100 cycles. |
| 13 | C relay group. | 29 | 10 kilocycles. |
| 14 | D relay group. | 30 | Voltage clear. |
| 15 | Unused. | 31 | Alarm. |

From this table, it can be seen that signals 13 and 14 are used to select the "C" and "D" relay groups and that the code signals 1 to 10 are used to select the ten relays in the case of each group. This is also true of the other four relay groups previously mentioned which, as indicated by the above table, are selected by the code signals 11 and 12.

The structures of the A and B crossbar switches are similar. The structure of the A crossbar switch is indicated by FIG. 9, and the arrangement of its select relays S1 to S10 and its hold relays H1 to H10 is indicated by FIG. 10. These two groups of relays are each controlled in the same way as the C1 to C10 relays of FIG. 8 with the exception that the transistor 75' and the elements by which it functions to select the relay group are replaced by the crossbar switch control circuit of FIG. 11.

The circuit includes a select control relay 83 and two hold control relays 84 and 85. The select control relay 83 is energized by the code signal 11 which is applied to the base of its input transistor 86. This relay is illustrated as in its de-energized condition and has four sets of contacts 87 to 90. Closure of contacts 87 connects a —7.5 v. line to the base of the transistor 86 thereby locking the relay 83 closed. Closure of contacts 88 energizes the ten gates (similar to the "and" gates of FIG. 8) which control select relays S1 to S10 (FIG. 10). Closure of contacts 89 discharges a capacitor 91 to produce a location advance pulse which is applied to a point TP2 on a location advance relay 47. Closure of contacts 90 applies a —24 v. locking voltage to the gates of the select relays S1 to S10.

The first relay code signal is applied to the gate of one of the select relays S1 to S5 (FIG. 10) and energizes the corresponding relay. A set of contacts 93, 94, 95, 96 or 97 on the selected relay discharges a capacitor 98 generating a location advance pulse which is applied to the terminal TP2 of the location advance relay.

The second relay code signal energizes one of the select relays S6 to S10. A set of contacts 99, 100, 101, 102 or 103 on the selected relay discharges a capacitor 104 generating a location advance pulse which is applied through a lead 104' to the base of the input transistor 105 of the hold control relay 84 which is thereby energized to close five sets of contacts 106 to 110.

Contacts 106 ground the base of transistor 86 thereby deenergizing the select control relay 83. Closure of contacts 107 keeps locking voltage on the selected S relays so that they remain closed. Closure of contacts 108 generates a location advance pulse which is applied through a diode 111 to the terminal TP2 of the location advance relay. Closure of contacts 109 connects the −7.5 volt terminal to the base of the transistor 105 thereby locking the hold relay 84 closed. Closure of contacts 110 energizes the hold control relay 85 after a time delay determined by a capacitor 112.

The hold control relay 85 has two sets of contacts 113′ and 114′. Closure of contacts 113′ connects a −12 volt lead to the ten gates which control the ten hold relays H1 to H10 (FIG. 10) so that the next relay code signal will energize a hold relay H1, H2, H3, H4, H5, H6, H7, H8, H9 or H10 automatically. The energized hold relay discharges a capacitor 113, 114, 115, 116, 117, 118, 119, 120, 121 or 122 producing a positive pulse which is applied to the base of the transistor 105. This deenergizes hold control relays 84 and 85 and closes contacts 114′ through which a capacitor 123 is discharged to provide a location advance pulse which is applied to the TP2 terminal of the location advance relay. The time delay produced by the capacitor 112 is essential to prevent the energization of a hold relay on the second select relay actuation.

The A and B crossbar switches (FIG. 1) are Cunningham Type F. They function to connect the stimuli sources or generators and measurement equipment of the checkout system to the device under test. Their physical structure is indicated by FIG. 9 wherein the select and hold relays bear the same designations as in FIG. 10. Each of the hold relays has six line terminals. Each of the select relays has six link terminals. If a select relay and a hold relay are energized in this sequence, an electrical connection is made between the appropriate six link terminals and six line terminals.

After this connection has been made, the select relay may be deenergized and the connection will remain so long as the hold relay is energized. This permits the actuation of two select relays before a hold relay is energized so that twelve link or select terminals may be simultaneously connected to the appropriate six line terminals, two select terminals being connected to each line terminal. Certain of the link or select terminals represent the output lines of the checkout system.

FIG. 12 is a contact schematic of one of the hold relays, for example, the hold relay H1 of FIGS. 9 and 10. Each of the select relays S1 to S10 has six link contacts which are represented in their energized condition by black arrows and in their deenergized condition by white arrows. The solid hold line represents the normally off position of the hold relay. The dotted hold line represents the energized position of the hold relay. The link contacts of the first five hold lines represent the output lines of the checkout system. The remaining twenty-five link contacts are wired to provide for line selection. If for example, the program should call for the connection of the output line 1 to the $H_1$ function, operation of the select relays S1 and S6 would precede the actutaion of the hold relay H1.

It should be understood that activation of the select relay moves the contact to the position indicated by the black arrow on each of the sixty hold lines of the crossbar switch. Since a maximum of two selects before a hold is imposed by the mechanical structure, the two select relays must be deenergized after the hold relay is closed as indicated above in connection with FIG. 10. The mechanical features of the crossbar switch insure that the connection between link terminal 1 of select relays S1 and S6 to line terminal 1 (FIG. 12) of the hold relays remain as long as the hold relay is energized.

The contact structure shown in FIG. 12 is repeated 10 times for each crossbar, one for each hold switch or H function. If, for example, the $H_1$ and $H_2$ functions were the probes of a meter, and it was desired to connect these probes to output lines 1 and 25, the operation of the crossbar switch would be as follows:

Energize and lock Select Relay 1
Energize and lock Select Relay 5
Energize and lock Hold Relay 1
After Hold relay 1 is locked "on" deenergize the select relays
Energize and lock Select Relay 5
Energize and lock Select Relay 10
Energize and lock Hold Relay 2

The actual number of different system functions which can be accommodated can, of course, be expanded very easily by the use of relays to switch different functions to these lines. An example of this type of expansion is hereinafter illustrated in connection with the stimuli section of the checkout system.

Each of the hold and select relays has a special set of "off normal" contacts associated with it. These contacts are used for locking and location advance generation. FIG. 12, previously discussed in connection with FIGS. 8 and 11, is a schematic of the relay contact circuitry. In each case the upper contact set is used to generate the location advance pulse, and the lower set of contacts is used to provide the relay locking through a voltage dropping resistor. Since the select relays are always used in a pair consisting of one relay from the first five and one relay from the second group of five, an added safety feature is obtained by wiring the locking and location advance pulse generation in series as shown. Should two relays be chosen from either group, no advance pulse would occur. This would cause the checkout equipment to stop. Since both the computer output relays and the control relays have lights on the front of the console to indicate the on-off state, the location of the cause of the malfunction is easy to determine.

As previously indicated, the crossbar switches are used to connect the stimuli sources and measurement equipment of the checkout system to the device under test. In addition to the conventional stimuli sources normally employed in a system of this type, the test procedure used requires the use of resistance and shorting elements as special stimuli sources for application to the tested device. The capacity of the switching system to connect the stimuli sources to the tested device is ten single stimuli lines to any of fifty output terminals of the tested device. The ten stimuli lines can be connected to any ten of the tested device output terminals at the same time.

The actual number of functions obtainable is increased by the use of relays to switch different functions to the ten function lines. For example, although only two function lines are assigned to the meter, relay switching is provided to use these two function lines for either the A.-C. voltmeter, D.-C. voltmeter or ohmmeter. Similar switching expands the two voltage lines to accommodate D.-C. voltage or A.-C. voltage of three different frequencies.

The assigned functions for the crossbar hold lines are as follows:

Hold 1—Meter +
Hold 2—Meter −
Hold 3—Voltage +
Hold 4—Voltage −
Hold 5—Resistance
Hold 6—Resistance
Hold 7—Short 1
Hold 8—Short 1
Hold 9—Short 2
Hold 10—Short 2

Each crossbar switch supplies these ten functions to twenty-five output lines.

The "C" and "D" relays (FIG. 1) each comprise a group of ten relays. The control for these relays is slightly different from that employed for a select or hold group on the crossbar switch. This is due primarily to the requirement that any number of these relays may be energized at the same time. In order to economize on the total number of program commands required to energize a given number of these relays, a different control circuit is used.

FIG. 13 shows the control circuit used for the "C" relay group. The control circuit of the "D" relay group is similar. As in the crossbar switch control circuit of FIG. 10, a group of ten relays is selected first. The No. 13 code signal is used to half select the group of ten "and" gates which control the "C" relays. This code signal functions through a transistor 124 to energize the group "C" select relay 125 which has three different sets of contacts 126, 127 and 128. The contacts 128 energize the "C" relay group gate. The contacts 127 discharge a capacitor 129 to provide a location advance pulse which is applied to the terminal TP2 of the location advance relay. The contacts 126 supply a reduced voltage for locking the relay closed.

Once the group select relay has been energized, group relays 1 to 9 inclusive may be energized by the application of code signals 1 to 9. Group relay C10 is used to unlock the group select relay 125 without unlocking the remaining relays 1 to 9. One contact set 130 of group relay C10 is used to generate a location advance pulse. No capacitor is required since this relay is a non-locking type. To unlock the "C" group relays a clear circuit, hereinafter described, interrupts the −24 volts to every relay of this group.

As stated above, the "C" and "D" relay groups provide nine relays for usable switching. FIG. 14 shows the schematic for the "C" group relays. These relays are used to provide various resistance values between the function lines of hold relays H5 and H6 (FIG. 10) of the crossbar switches. Since up to nine relays may be locked on at any one time, the various combinations of parallel resistance are available. This makes available a considerable range of resistance values. As can be seen from FIG. 14 each of the "C" relays has a locking contact 131 and a location advance contact 132 which function as explained in connection with other similar circuits.

The "D" group of relays is similar to the "C" group. It is used to program the D.-C. power supply for voltages other than the 28 v. and 100 v. provided by the circuit of FIG. 16. This power supply provides 1 volt/ 1000 ohms across the program terminals. Therefore the resistance lines are wired to these terminals, instead of to the hold lines as in the case of the "C" relays, as shown in FIG. 16, points 172, 173.

The digital conversion equipment comprises the measurement capabilities of the checkout system. The function of this equipment is to provide a measurement of an analog quantity and to convert it into a digital form suitable for processing into the computer. This equipment is commercially available in various forms. The instrument actually used was a "Relay Operated D.-C./ A.-C. Volt-Ohmmeter," manufactured by Electro-Instruments, Inc., San Diego, California. For the checkout system, this conversion equipment provided six modules. Five of these modules are standard catalog items. The sixth is a special modification of a catalog module developed for the checkout system. This special module is a read circuit hereinafter explained.

The standard modules used in the checkout system are as follows.

(1) Power Module DXA–000: This module provides the power required to operate the multimeter system.

(2) D.C. Voltmeter DVX–500:
  Readout _____ 5 digits.
  Accuracy _____ ±0.01% +x digit.
  Range _____ 0.0001 to 999.99 volts.
  Input impedance _____ 1000 megohms to 10 volts, 10 megohms for higher voltages.
  Average balancing time ___ 2 seconds.

(3) A.C. to D.C. Converter DXX–010:
  Readout _____ 4 digits.
  Accuracy _____ ±0.1% or 2 digits.
  Range _____ 0.0001 to 999.9 volts.
  Input impedance _____ 1 megohm, 20 mmf. to 10 volts; 10 megohms, 20 mmf. for higher voltages.
  Average balancing time ___ 3 seconds.
  Frequency response _____ 30 to 10 kc.

(4) Ohmmeter DOX–500:
  Readout _____ 5 digits.
  Accuracy _____ ±0.01% +1 digit to 100K ohm,
                   ±0.03% +1 digit to 1M ohm,
                   ±0.05% +1 digit to 5M ohm,
                   ±0.1% +1 digit 10M ohm.
  Range _____ 000.01 ohm to 9.9999 megohms.

(5) Switch Module MSM–051–P: This module provides facilities for switching the multimeter system to the proper type meter either manually by switch or remotely by closing the proper relay energizing circuits.

Complete technical information on this equipment is available in the Electro-Instruments, Inc. operating and maintenance manuals for these catalog equipments.

The switch module MSM–051–P provides for the remote switching of the digital multimeter system into any one of its three measurement instruments. This is accomplished by the relays 133, 134 and 135 of FIG. 15. The relay 133 is energized by code signal 21 and has five sets of contacts 136 to 140. Contacts 136 provide a locking voltage for the relay, contacts 137 provide a location advance pulse, contacts 138 connect the common control terminal 141 to the D.-C. volt control terminal 142, contacts 139 connect the volt probe 143 to the H2 crossbar function line and contacts 140 connect the 144′ crossbar function line to the H1 crossbar function line.

The relay 134 is energized by code signal 22 and has five sets of contacts 144 to 148. Contacts 144 provide a locking voltage, contacts 145 provide a location advance pulse, contacts 146 connect the common terminal 141 to the A.-C. volt control terminal 145′, contacts 147 connect the volt probe terminal 143 to the H2 crossbar function line, and contacts 148 connect the volt probe 144′ to the H1 crossbar function line.

The relay 135 is energized by the code signal 23 and has five sets of contacts 146′ to 150′. The contact 146′ provides a locking voltage, the contacts 147′ provide a location advance pulse, the contacts 148′ connect the common terminal 141 to the ohms control lead 151, the contacts 149′ connect the ohm probe 152 to the H2 crossbar function line, the contacts 150′ connect the ohm probe 153 to the H1 crossbar function line.

A clear relay 154 is energized by code signal 24 and has contacts 155 which are operated (1) to deenergize the relays 133, 134 and 135 by interrupting their connection to the −24 v. terminal and (2) to generate a location advance pulse.

The test probes of the three measuring instruments are provided at separate terminals of the multimeter system. The circuit of FIG. 15 effects remote control of the meter system and controls selection of the proper set of probes. The unused meter probes are grounded automatically. This prevents the meter from reading stray pickup voltages or affecting the accuracy of the meters being used. It should be noted that the A.-C. and D.-C. voltmeter probes are the same. The change in meter is accomplished by the insertion of the A.-C. to D.-C. converter in the probe line by the switch module.

In order to perform the tests for piece-part fault isolation, a certain number of stimuli relating to its use and operation are required. In addition to the conventional voltage and signal stimulation referred to, resistance may be used as previously described in connection with the "C" and "D" relays. As herein used the term stimuli is also intended to cover any external circuit, other than a measurement circuit, which is connected to the test terminals of the device to be tested to apply a control function relating to the test. Using this definition, the shorts on the crossbar switch hold lines H7 to H10 (FIG. 10), are stimuli. In what follows, however, only the generation and control of voltage stimuli are considered.

The stimuli control circuit used in the checkout system is illustrated by FIG. 16. This circuit includes relays 159 to 163 which are connected to a −24 v. terminal through contact 164 of a voltage clear relay 165. The relay 159 is energized by the application of signal 25 to its input transistor and has contacts 166 to 170. The contact 166 locks the relay 159 closed, contact 167 produces a location advance pulse, the contact 168 connects a −28 v. D.C. terminal to the H3 crossbar terminal, the contact 169 connects a +28 v. D.C. terminal to the H4 crossbar and the contact 170 connects a 28K resistor 171 between the terminals 172 and 173 which are connected to the output terminals of the operational voltage or power supply elements of the stimuli sources 43. In the present example it may be assumed that these may be the program terminals of a power supply device or unit of the type known commercially as the Nobotron Model 300S Programable Power Supply to program the power supply for 28 v. A similar contact 170A is used to connect a 100K resistor 171A between the same terminals to program 100 volts from the supply source. The relays 160 to 163 are energized by signals 26, 27, 28 and 29 respectively and function to perform switching operations which are apparent from FIG. 16. The voltage clear relay is energized by signal 30 and functions through its contact 164 to deenergize any of the relays 159 to 163 which may have been locked closed. It also operates through its contact 174 to produce a location advance pulse.

The digital converter or multimeter 44 is a relay type which makes the decimal digits available as one of ten relay closures. To transform this single relay closure into a 5-level Teletype code, the encoding matrix illustrated by FIG. 17 is employed. Provision is made for encoding decimals 1 to 9, plus and minus signs and a period. The output of this matrix is by way of relays R1 to R7, the contacts of which are correspondingly identified and are shown separately for ease of understanding. How these relays function to read the measurement into the computer 50 is to be explained in connection with FIGS. 18 and 19 which illustrate the changes made in the connections between the computer and the typewriter or printer 33 to enable (1) the computer output to be delivered either to the printer or to the computer output relays and (2) the output of the read circuit to be delivered to the computer.

In their commercial form, the computer and printer are connected together through a cable and transmit signals in either direction. This connection was modified so that whenever a carriage return, tab or backspace coded signal was sent to the printer, it executes the command, and switches the computer to the computer output relays and deactivates itself. Succeeding commands are all sent from the computer to the computer output relays until a coded command signal 20 reroutes the computer to the printer.

This is accomplished by the circuit of FIG. 18. In this circuit, relays 60 to 64 are the same relays as appear in FIG. 3, points 51 to 55 correspond to the terminals having the same designation in FIG. 2, and relays 174 to 178 form a standard part of the printer 33. The computer output signals appearing at terminals 51 to 55 are the outputs of thyratron tubes and, depending on whether or not these tubes have fired, the relays 174 to 178 in the printer are energized. With the circuit as illustrated, the signals are going to the printer 33.

When the carriage returns after a carriage return, tab or backspace signal is received by the printer, it closes a switch 179. This energizes relays 180 and 181. Relay 180 has contacts 182 and 183. Contacts 182 switch the computer output from the printer to the computer output relays. Contacts 183 lock the relays 180 and 181 closed. Relay 181 has a contact 184 which interrupts a signal connection to the printer. Relay 186 causes the digital meter to read the measured number into the computer. The relay 186 closes when relay 181 is energized and a read command is applied to it from the computer.

Other features of FIG. 18 are a location advance relay 47 which is part of the location advance circuitry hereinafter described, a relay R7 which is a part of the read circuit of FIG. 17, a relay 185 which operates to deenergize the computer thyratrons, and a clear relay 187 which is energized by signal 20 to deenergize the relays 180 and 181 so that the computer output terminals are transferred from the computer output relays to the printer. Blocking diodes are connected between the computer output terminals and the various relay coils to prevent extraneous low current paths. A capacitor 189 delays energization of relay 185.

Normally entry to the computer by the printer can be either four or six bit characters. These characters are in the form of relay contact closures. In order that either the printer or the digitizing equipment could effect entry into the computer, the relays R1, R2, R3 and R4 of the encoding matrix (FIG. 17) were connected in parallel with the printer relays as indicated by FIG. 19.

The way the equipment worked before the contacts were parallel was that four contacts 190 to 193 would set up a character and a fifth contact 195 would then provide a pulse transferring the character into the computer. R1 to R4 (FIGS. 17 and 19) are the four information relays which set up the character to be read into the computer when this character is coming from the digitizing equipment of FIG. 17. Relay R6 functions to transfer the character into the computer. The advance of the computer is normally caused by momentarily opening the connection from a terminal 196 of the printer to a terminal 197 of the computer (FIG. 18). This connection was modified by the insertion of a normally closed contact on the relay R7 of the read circuit.

The start read relay 186 is energized by a special computer command signal. This command automatically stops the computation of the computer and assigns the computer accumulation to receive the reader information. Since only a momentary closure of the relay 186 is required and the 90 v. signal is a steady state, a differentiating circuit 198–199 is used with a blocking diode 200 to eliminate the redundant pulse caused by removal of the 90 v. signal.

The digital equipment 44 is made up of the stepping switches which position in accordance with the reading of the measurement. Each decimal digit has a stepping switch associated with it. In the read circuit 48 there is a stepping switch which is caused to sequence by the start read circuit. This puts a B+ voltage on the wiper arm of each of the decimal digit stepping relays. The contacts of these relays are connected to the proper terminals of the encoding matrix of FIG. 17. The encoding matrix causes the relays R1 to R4 (FIGS. 17 and 19) to close in accordance with the code set up in the encoding matrix.

The checkout system uses the accumulator register of the LGP–30 computer to receive measurement information. After the computer has issued a "P I" command, the accumulator is automatically cleared and the start read relay is energized.

The digital conversion equipment 44 puts out the measurement value one digit at a time starting with the most significant digit. The digit value (in a four bit code) is read into the accumulator in the least significant 4-bit position. After a character is read, relay R6 closes momentarily and advances the information in the accumulator 4-bit position to the left. This continues until the entire reading is in the accumulator. Then relay R7 closes momentarily producing a location advance signal which transfers control of the computer program to the next memory location of the computer. The instruction in this location usually transfers the contents of the accumulator register to the computer memory.

FIG. 20 shows the circuit utilized to apply the location advance pulse to the computer. This circuit is interrelated with the circuit of FIG. 18 as indicated by the reference numerals common to the two figures.

The computer output commands control two types of switches: Those which are closed momentarily and those which are locked closed for more than one computer command. When the location advance pulse is to be initiated by a momentarily closed switch, a ground signal is wired from a normally open relay contact to the point TP1. This energizes the location advance relay 47 after a time delay produced by the capacitor 201. When the location advance signal is to be initiated by a locked relay, the signal is applied from the relay to the terminal TP2 and energizes a sensitive relay 202 which in turn energizes the location advance relay 47. As repeatedly indicated above in connection with the various parts of the system, the initiating signal is produced by a charged capacitor on the locking relay. The relay 202 is locked at a reduced voltage through a resistor 203 to insure fast drop out, and the current to relay 47 is limited by resistor 204 to protect the contacts.

The location advance relay 47 has contacts 205 and 206 (FIGS. 18 and 20). As shown more particularly in FIG. 18, the contact 205 operates to interrupt the return lead 56 of the computer output relays and clear the computer output thyratrons. Contact 206 completes a circuit for the relay 185 after a capacitor induced delay which opens the circuit through 196 and 197 to allow the computer to advance to the next memory location and execute its command.

As indicated by FIG. 21, the checkout system includes a general clear relay 207 and a clear relay 208 or 209 for the A and B crossbar switches. These three relays are energized by command signals 16, 17 and 18 which are applied to their input transistors as explained in connection with previous figures. These relays are energized only momentarily, so that a direct location advance signal is provided by closure of the contacts 210, 211 or 212. Clearing action is effected by activating contacts 213, 214, and 215 to interrupt the locking voltages of the various relay groups.

The present checkout system extends the same technique of logic and data handling, in the form of digital information currently used in digital computers and data processing to the automation and actual testing of devices. Maximum emphasis is placed on utilizing the computer as the controller, the source of basic intelligence and the memory for connecting or inter-connecting measuring devices, signal devices, stimuli sources or signal paths to make the proper measurements, create the conditions required by the analytical expression previously stored in the computer and to perform the various steps necessary to accumulate the data required to determine the condition or specific area of malfunction of the device under examination.

The same process that is utilized to generate design or fabricate devices is used in reverse to analyze, diagnose and assist in the correction of these malfunctioning devices.

A secondary feature of the system is that it can produce the results in any form desired by the particular system in which the device under test is being utilized, that is, it can produce punched or magnetic tape or a means for transmitting the data from the test site to a warehouse, a depot, a factory, or a supply system for procurement or purchase of the component. It can produce a record which can be filed for later use and sorted by mechanical electrical means such as card sorters for computer application. It can provide requisition forms and maintain a running inventory of the components required for the repair. In the medical field it can provide an accurate, untiring means of accumulating data relating to symptoms of disease or malfunctions of persons being examined, correlated with previous experience, and considerably aid the diagnostician or doctor in arriving at a proper solution to the symptoms. In the medical field it is also an extremely unique and valuable research tool in that it can provide means of accumulating a considerable amount of data not subject to human interpretation or misinterpretation for utilization in longer term research programs.

The above-described checkout system, eliminates the need for high operator skill levels, long periods of training, special test and fixtures and test equipment, reduces the time required for performance of the test, and, in effect, establishes a completely new concept in the field of maintenance. The previous limitations on unit and system designs to be maintained by individuals having limited training and skill levels and test equipment and fixtures of limited cost and complexity no longer exist in the current concept. The degree and systems to which the computer controlled automatic diagnostic and checkout system can be applied is only limited by the imagination of the maintenance effort. For example, the system can be applied to the automatic testing of weapons systems such as guided missiles, the automatic testing of vehicles such as tanks, trucks, automobiles, together with such components as engine suspension systems, etc., medical diagnosis of physical characteristics of individuals or test specimens. It can be applied, in addition, with equal facility, to hydraulic, pneumatic, electrical, electronic and mechanical equipment. Furthermore, the invention can be applied to automatic calibration of secondary standards and, in principle, wherever an analytical expression can be provided to describe performance of a device and a means of obtaining from this device some form of data as to its performance. The computer controlled checkout can automatically diagnose or test the system, describe its maintenance requirements and instruct a low technical skill level person, where possible, to repair such a device. After repair, the automatic diagnostic system can then requalify the device which has just been repaired.

We claim:

1. An exclusively computer-controlled test apparatus for composite electrical and mechanical equipment and elements thereof which eliminates the need of and use for perforated tapes and tape controls as sources of program material for a predetermined series of tests to be applied to said equipment and elements, said test apparatus comprising, in combination, digital computer means as the sole test signal storage and control means of said apparatus, said computer means having electrical circuits and elements providing at its output terminals sequential coded test signals in accordance with a stored program of tests to be made on said equipment and elements thereof, a first group of signal responsive test circuit elements including routing control circuits and output relays each connected to a different one of said computer output terminals and responsive to the signal output therefrom, and each having a pair of output leads one of which is at one fixed control voltage representing a binary 1 and the other of which is at a different fixed control voltage representing a binary 0, means connected with said output leads for decoding the output voltages of said signal-responsive elements to provide coded control signals based upon and a multiple of said coded test signals, means for generating stimuli representing test conditions to be applied to the apparatus, a second group of signal-responsive test-circuit elements including switch control circuits, control means responsive to one of said control signals connected for applying and maintaining a control voltage on said apparatus whereby said second group of signal-responsive elements is selected for operation and made responsive to subsequent control signals, said second group of control signal-responsive elements including control switch means providing paths for selectively controlling and applying said test stimuli to said equipment and elements thereof to derive measurement data therefrom, means for applying to the digital computer means converted measurement data therefrom for evaluation, and means for deriving an indication of the evaluation and test results from said computer means.

2. An exclusively computer-controlled test apparatus for composite electrical and mechanical equipment and elements thereof which eliminates the need of and use for perforated tapes and tape controls as sources of program material for a predetermined series of tests to be applied to said equipment and elements, said test apparatus comprising, in combination, digital computer means as the sole test signal storage and control means of said apparatus, said computer means having electrical circuits and elements providing at its output terminals sequential coded test signals in accordance with a stored program of tests to be made on said equipment and elements thereof, a first group of coded-signal-responsive test circuit elements each connected to a different one of said computer output terminals and responsive to the signal output therefrom, and each having a pair of output leads one of which is at one fixed control voltage representing a binary 1 and the other of which is at a different fixed control voltage representing a binary 0, means connected with said output leads for decoding the output voltages of the signal-responsive elements to provide coded control signals based upon and a multiple of said coded test signals, means providing control signal sources representing a plurality of operational test conditions for said equipment and elements thereof in accordance with said program, a second group of control-signal-responsive test circuit elements connected with said sources for selectively applying control signals representing said operational test conditions to said equipment and elements thereof, a plurality of gate means each connected to a different component of said second group, control means responsive to one of said control signals connected for applying and maintaining on said gate means a control voltage whereby said second group of control-signal-responsive components is selected for operation and made responsive to subsequent control signals, said second group of control-signal-responsive components including control switch means providing paths for selectively applying said operational test conditions to said equipment and the components thereof, means for feeding back to the digital computer means converted measurement data resulting from said tests for evaluation by digital computational means, and means for deriving an indication of test results from said computer means in accordance with said program.

References Cited by the Examiner

UNITED STATES PATENTS

| 2,328,750 | 9/1943 | Smith | 324—73 |
| 2,849,677 | 8/1958 | Hannon | 324—73 |
| 2,954,731 | 10/1960 | Durand et al. | |

FOREIGN PATENTS 798,571 7/1958 Great Britain.

OTHER REFERENCES

British Institution of Radio Engineers (Keating), December 1957, vol. 17, No. 12; pp. 707–715.

"Design of Switching Circuits," Keister, Ritchie and Washburn, D. Van Nostrand Company, Inc., 1951.

WALTER L. CARLSON, *Primary Examiner.*

ROBERT EVANS, *Examiner.*

R. C. QUEISSER, G. S. KINDNESS, E. L. STOLARUN,
*Assistant Examiners.*